Nov. 12, 1968  J. W. LE BARRE  3,410,160
ADJUSTABLE BORING BAR
Filed April 8, 1966  3 Sheets-Sheet 1

INVENTOR.
JAMES W. LE BARRE
BY Freeman & Taylor
ATTORNEYS

Nov. 12, 1968   J. W. LE BARRE   3,410,160
ADJUSTABLE BORING BAR
Filed April 8, 1966   3 Sheets-Sheet 2

INVENTOR.
JAMES W. LE BARRE
BY Freeman + Taylor
ATTORNEYS

Nov. 12, 1968   J. W. LE BARRE   3,410,160
ADJUSTABLE BORING BAR
Filed April 8, 1966   3 Sheets-Sheet 3
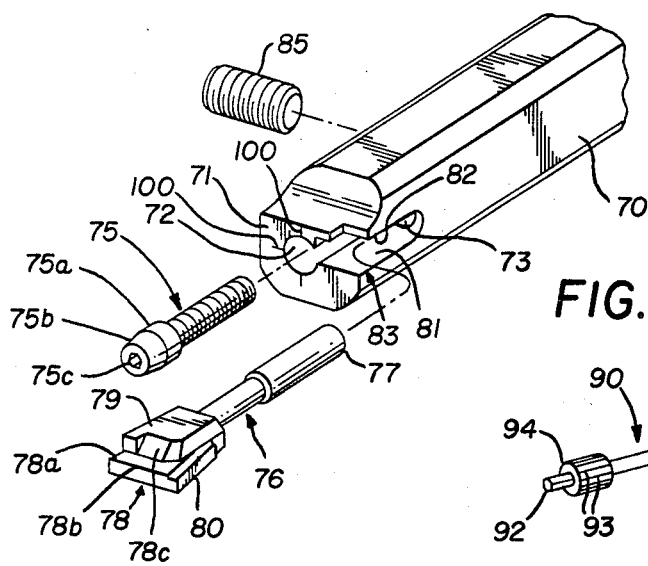
FIG. 6
FIG. 10
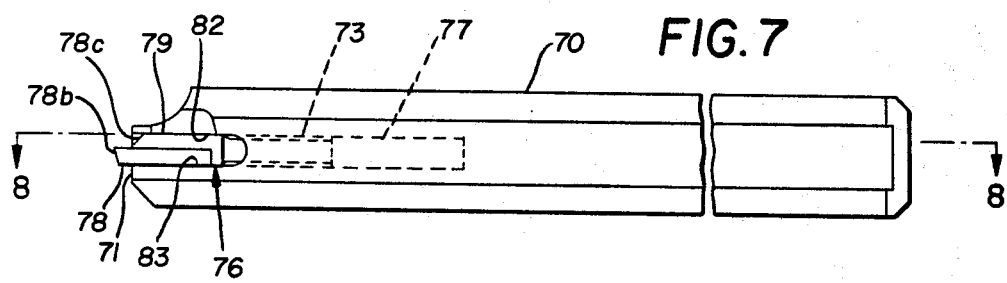
FIG. 7
FIG. 8
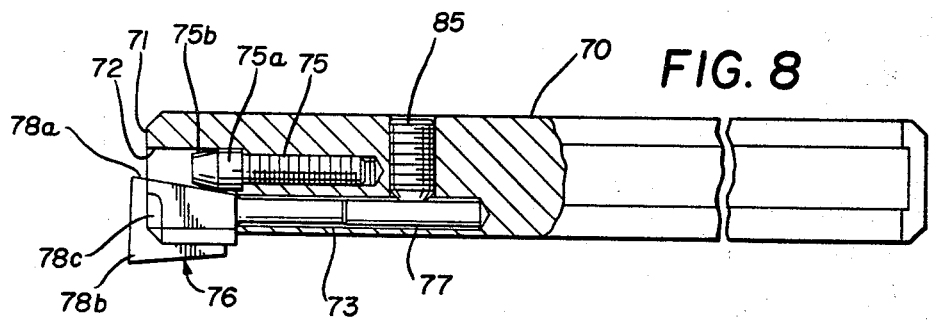
FIG. 9
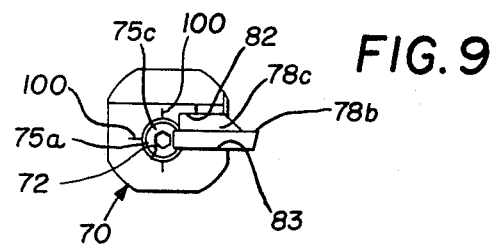
INVENTOR.
JAMES W. LE BARRE
BY
Freeman + Taylor
ATTORNEYS United States Patent Office 3,410,160
Patented Nov. 12, 1968

3,410,160
ADJUSTABLE BORING BAR
James W. Le Barre, Clinton, Ohio, assignor to The Warner & Swasey Company, Cleveland, Ohio, a corporation of Ohio
Filed Apr. 8, 1966, Ser. No. 541,227
10 Claims. (Cl. 77—58)

ABSTRACT OF THE DISCLOSURE

A boring bar for machining work pieces having a radially opening slot in one end and a socket extending axially of the tool body and communicating with the slot. An elongate cutting element with a shank and cutting tip has its shank received within the socket and its cutting element received within the slot. Adjustment means are disposed in the slot to radially flex the cutting element for adjustment purposes.

---

This invention relates to the art of machine tools and more particularly has reference to boring bars wherein the cutting diameter may be effectively adjusted with minimum effort.

In the concurrently filed application of Gilbert F. Lutz, entitled Adjustable Boring Bar and filed April 8, 1966 as Ser. No. 541,309 there was disclosed an improved boring bar wherein adjustment was effectuated by flexing the cutter element per se through a straight line path of movement with the cutter being contoured for reception in a side opening groove, and with the adjustment per se being effected by the use of a camming element that was carried by an adjustment screw so as to cammingly engage the appropriate surfaces of the cutting insert and thus effectuate the requisite adjustment.

While the above described method of adjustment has proved satisfactory it has been found that the over-all performance characteristic of the tool per se can be enhanced in several respects.

First, it has been found that if the shank of the cutting insert per se is inserted or socketed within an endless opening that the necessity for drilling and tapping of the insert per se will not be required since the shank portion thereof can be received within the endless opening and merely clamped in place therein by the usual set screws.

It has been further discovered that if the camming surface is provided on the cutter per se, that an arrangement exists wherein the leverage arm that causes flexure will progressively increase as outward flexure of the cutter occurs. In this manner the end result of such an arrangement is that greater flexing force is applied as the need for the same occurs in contrast to the prior art situation where the amount of such flexing force continually decreased as further flexure occurred.

Production of an improved adjustable boring bar having the above advantages accordingly becomes the principal object of this invention with other objects of the invention becoming more apparent upon a reading of the following brief specification, considered and interpreted in the light of the accompanying drawings.

Of the drawings:

FIGURE 6 is an exploded view similar to FIGURE 2 but showing a modified form of boring bar adapted to employ "throw away" types of cutting cartridges.

FIGURE 7 is a side elevation of the boring bar shown in FIGURE 6.

FIGURE 8 is a sectional view taken on the lines 8—8 of FIGURE 7.

FIGURE 9 is an end elevation of the boring bar shown in FIGURE 7.

FIGURE 10 is a perspective view showing a turning wrench adapted to adjust the boring bar shown in FIGURES 1 through 9 inclusive.

Figure 1:
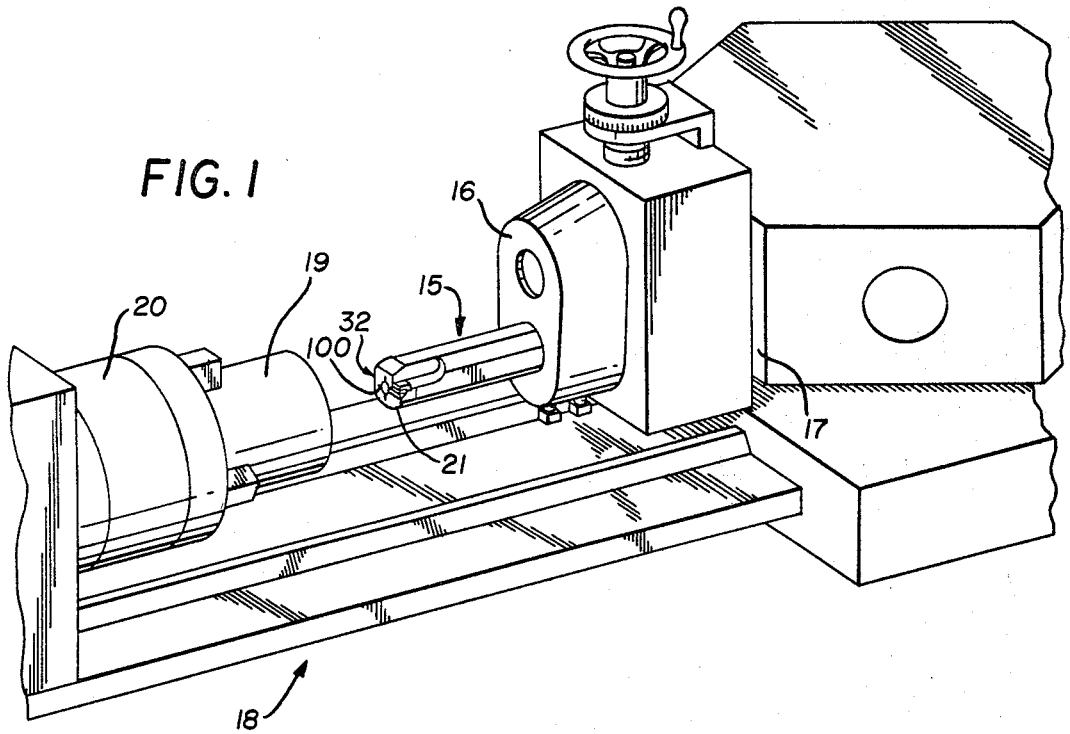
FIGURE 1 is a schematic view showing the improved boring bar in operative position on a turret lathe.

Referring now to the drawings and in particular to FIGURE 1, the improved boring bar, generally designated by the numeral 15, is shown carried by a slide tool 16 that is in turn mounted on one turret head 17 of the conventional turret lathe 18, with a revolving workpiece 19 being carried in the spindle 20 so as to permit the cutting edge 21 of the boring bar to cut a predetermined diameter interiorly thereof in a fashion well known in the prior art.

Figure 2:
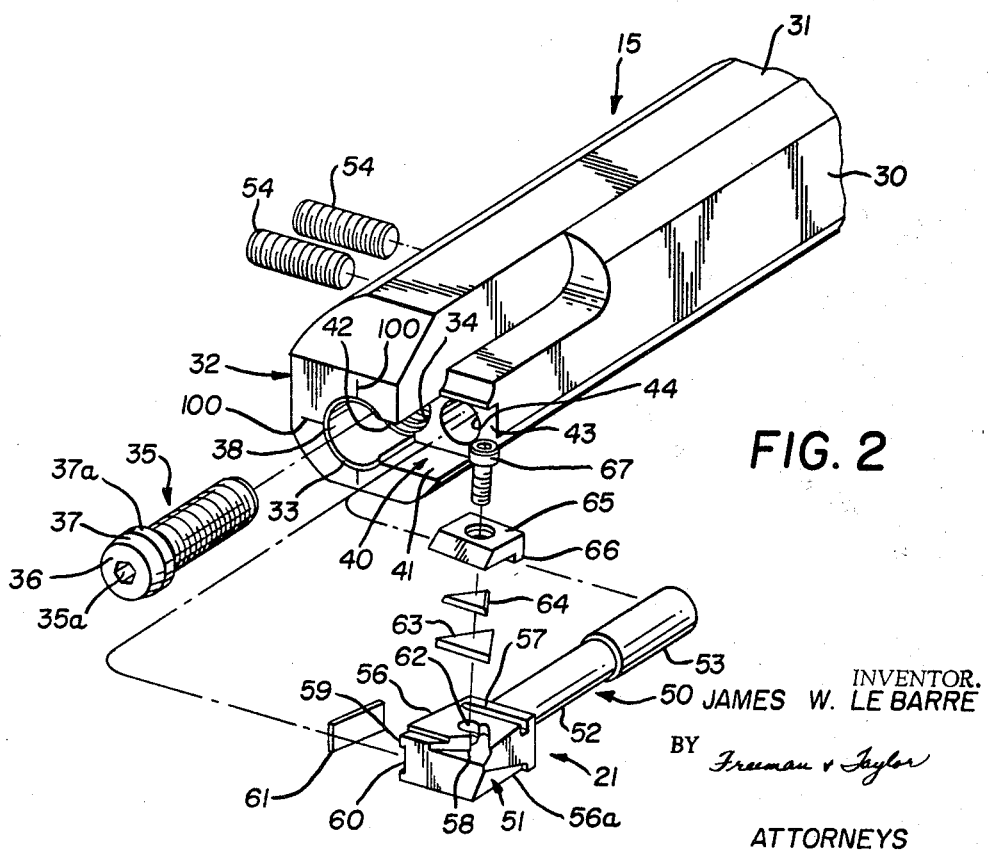
FIGURE 2 is an exploded perspective view showing the improved boring bar.

Referring now to FIGURE 2 for a description of the boring bar 15 per se, it will be noted that the same includes an elongate body portion 30 of tool or other high strength steel that has its exterior surface appropriately contoured to permit reception of its inboard end 31 within the tool slide 16 while the cutting end 32 projects therefrom as is clearly shown in FIGURE 1 of the drawings.

Extending inwardly from the cutting end 32 is an axial bore 33 that communicates with a concentric threaded bore 34 (see FIGURE 4) so as to permit reception of a camming screw 35, with the head 36 thereof having a tapered peripheral surface portion 37 which terminates in a shoulder 37a. This shoulder provides a "point" contact with the cartridge head so as to permit flexing pressure to be applied to the cutting cartridge member 21 as will subsequently be described. The head 36 also has an axial wrench-receiving opening 35a therein for adjustment purposes as will also be subsequently described.

Figures 5, 11:
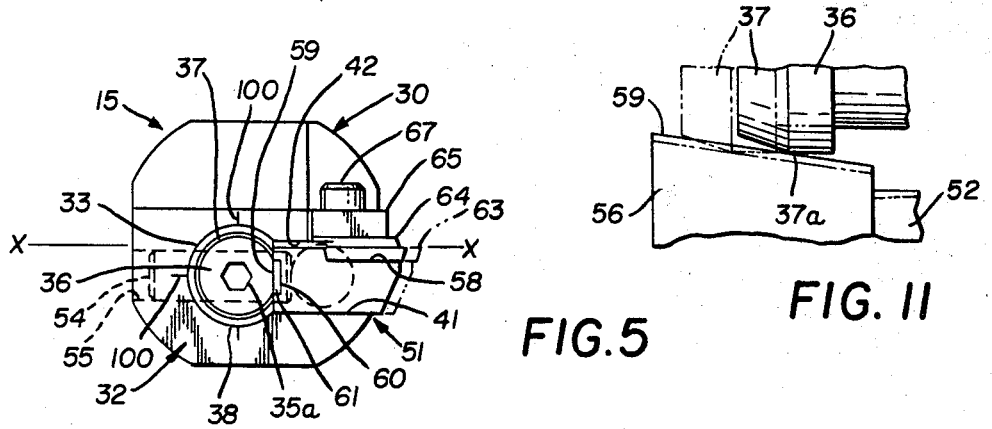
FIGURE 5 is an end elevation looking at the forward cutting portion of the boring bar.
FIGURE 11 is an enlarged partial planar view showing the contact between the camming screw and the cartridge.

A liner sleeve 38, having a cross sectional configuration generally conforming to that of bore 33, is telescopically provided in the bore 33, with it being noted from FIGURES 2 and 5 that the bore 33 and sleeve 38 have an open arcuate section along their peripheries so as to provide access to a guide slot that is generally designated by the numeral 40 in FIGURE 2 of the drawings.

This guide slot 40 includes opposed planar surfaces 41 and 42, with these surfaces being parallel to each other and extending between the bore 33 and the exterior of the cutting tool 30. Preferably these surfaces 41 and 42 are disposed parallel to an imaginary horizontal cutting plane that is designated by the lines X—X in FIGURE 5 of the drawings.

The guide slot 40 further includes an end wall 43 with this wall 43 having an inwardly extending bore 44 that is designed to receive the shank portion of the cutting cartridge 21 which will now be described.

In this regard the cutting cartridge 21 includes shank portion 50 and a head portion 51 with the shank portion 50 being generally circular in cross section and including an enlarged end portion 53 and an intermediate portion 52 of reduced diameter. Although difficult to depict in the drawings, the end portion 53 preferably has a flattened portion 51a on its one side surface against which lock screws 54, 54 may bear, with the lock screws 54, 54 being threaded into tapped cross bores 55, 55 that extend inwardly from the periphery of bar 15 to communicate with the bore 44 as clearly shown in FIGURE 4 of the drawings.

Referring next to FIGURE 2, the head portion 51 of cutting cartridge 21 is of generally rectangular configuration and has a top surface 56 that is undercut to provide both a groove 57, that extends at least partially thereacross, and a triangular seat 58. Additionally, the top surface includes a downwardly extending threaded bore 62.

Received within the just described seat 58 is a triangular shaped cutting bit 63 having the usual cutting edges arranged in forwardly projecting relationship so as to effectuate a boring operation when assembled as shown in FIGURE 1.

A triangular shaped chip deflector insert 64 is received in superimposed relationship to the insert 63 with the deflector 64 having the usual inclined leading edge to initiate chip deflection in known fashion.

For the purpose of securig the just described members 63 and 64 in place a clamping head 65 is provided to overlie these members, with head 65 having a rib 66 that may be received in the groove 57, and with clamping being effectuated by use of the bolt 67 that is passed therethrough and threadingly received within the bore 62.

One sidewall 59 of head 51 has a groove 60 within which a carbide, or other high wear-resistant insert 61, is inserted for the usual purpose of preventing excessive wear. In addition to having the groove 60 provided therein, the side edge 59 is further contoured to include a slight taper from a maximum width at its front edge to a minimum width at its rear edge as clearly shown in FIGURE 4 of the drawings. The cooperation of this taper with the shoulder 37a on head 36 of camming screw 35 will result in deflecticon of cartridge 21 occurring upon axial shifting of the adjustment screw 35 as will be described more fully below.

In this regard the "point" or "line" type of contact shown in FIGURE 11 permits a degree of accuracy in flexure that would not be possible with "surface-to-surface" engagement due to angular variations.

Figure 3:
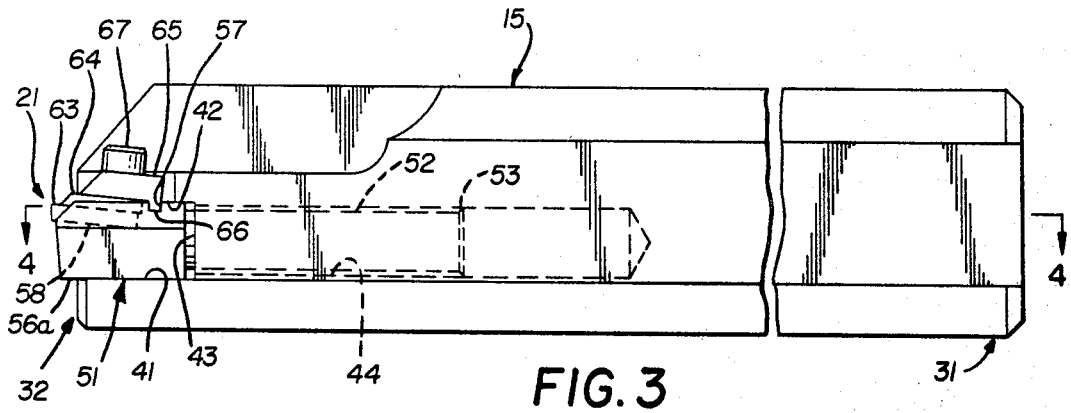
FIGURE 3 is a side elevation of the improved boring bar in assembled condition.
Figure 4:
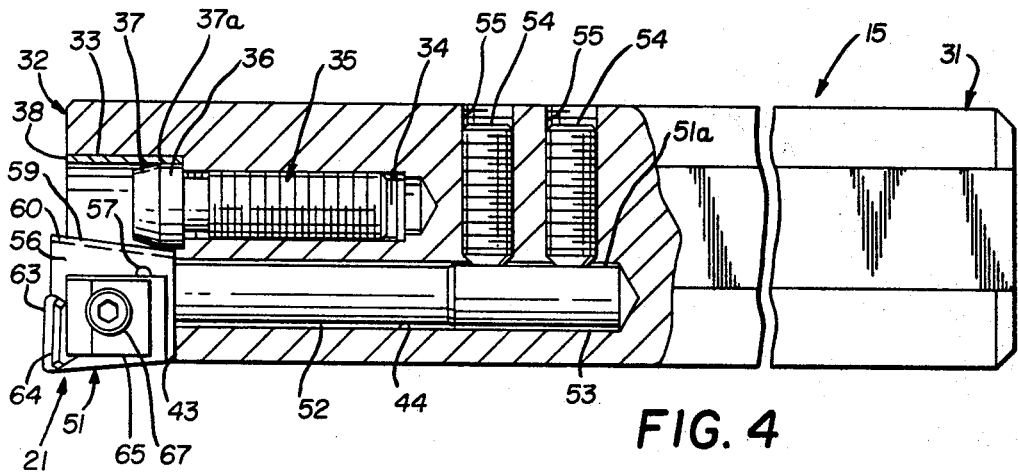
FIGURE 4 is a partial sectional view taken on the lines 4—4 of FIGURE 3.

In use or operation of the improved boring bar 15 it is merely necessary that the cartridge 21 be assembled with the cutting bit 63, deflector 64 and clamping head 65 in engaged relationship and with all components seated on head 51 as clearly shown in FIGURES 3 through 5 of the drawings.

At this time the adjustment screw 35 should be threaded into the bore 34 with full insertion of the adjustment screw taking place prior to insertion of the cartridge 21. With the adjustment screw 35 positioned as shown in FIGURE 4, for example, cartridge 21 may now be inserted axially into the slot 40 and the bore 44, with the top and bottom surfaces 56, 56a of head portion 51 respectively slidingly engaging the surfaces 42 and 41 of guide slot 40 during such insertion.

When the cartridge unit 21 has been inserted to the full depth possible the clamping screws 54, 54 may be tightened against flattened portion 51a. At this time axial shifting of the cartridge 21 within bore 44 and slot 40 is precluded.

In the event it is desired to effectuate adjustment of the cutting tip 63 it is merely necessary that the adjustment screw 35 be backed out of the bore 34, with it being noted that such backing out can occur without the necessity of loosening or otherwise moving any of the previously tightened component parts. The result of such unseating of the adjustment screw 35 can be best noted from FIGURE 5 wherein it will be observed that point contact between shoulder 37a on screw head 36 and the tapered side 59 of head 51 causes the unit to move to the chain dotted line position clearly shown in FIGURE 11, with the cutting edge constantly remaining in the horizontal plane X—X during such shifting. This basic movement is permitted due to the fact that end portion 53 of the cartridge is snugly held in bore 44 while the bore is oversize with respect to intermediate shank portion 52 so as to provide some degree of clearance that permits flexure of the shank and resultant movement of the head 51 of the type just described. Such shifting will occur entirely within the horizontal plane because of the key and slot arrangement between head 51 and slot 40, which prevents movement in any other direction.

It should also be apparent from FIGURE 11 that the point at which flexing force is applied (the lever arm) progressively moves towards the cutting end as the adjustment screw 35 is retracted from the bore 34, with this arrangement resulting in increased force being applied for flexing purposes due to the increased moment arm that is progressively obtained.

It is believed further apparent that the inherent recovery properties of the cartridge shank 50 will cause the shank to return to the full line position of FIGURE 5 in the event that the adjustment screw 35 is moved in reverse direction so as to in effect move deeper into the bore 34.

It will be also noted that in the event of damage to the cutting bit 63 that the same can be quickly and readily removed by merely backing off the clamping member 67 followed by reinsertion of a new bit. In the event of cartridge damage or the like, it is merely necessary that the locking screws 54, 54 be backed out whereupon the tool can be readily and easily removed.

The modified form of the invention shown in FIGURES 6 through 9 inclusive is of similar construction but involves utilization of a "throw away" type cartridge rather than the cartridge with a replaceable cutting bit of the type shown in FIGURES 1 through 5 inclusive. In this form of the invention the bar 15 has a similarly contoured body portion 70 that in turn has a forward end 71 from which there are provided inwardly extending bores 72 and 73 with bore 72 receiving adjustment screw 75 while cutting cartridge 76 has its shank end 77 received within the bore 73. Again the head portion of cartridge 78 has top and bottom parallel faces 79 and 80 that respectively slidingly engage the surfaces 81 and 82 of guide slot 83 which communicates with bore 72.

The head 75a of adjustment screw 75 again has a tapered surface 75b terminating in a shoulder 75c that engages the tapering sidewall 78a of head 78 as shown best in FIGURE 8. A locking screw 85 again is employed to retain the cartridge 76 in longitudinally fixed relationship within the slot 83 and bore 73.

As can be seen, the basic construction of the bar 15 and its component parts is similar in this form of the invention. The difference here however lies in the provision of an expendable or "throw away" type cartridge and as described above, the shank portion 76 thereof is similar to that shown in FIGURES 1 through 5. However, the head portion instead of including the cutting tip 63, chip breaker 64, clamping member 66 and locking screw 67 is an integral one-piece member and has a cutting bit 78b and an integral chip breaker 78c.

Adjustment of the cutting diameter effectuated by the cartridge 76 is again accomplished by moving of the adjustment screw 75 axially within the bore 72 much in the same fashion as was earlier described with regard to FIGURES 1 through 5 and with the head again moving only in a horizontal plane.

Turning next then to the adjusting wrench 90 shown in FIGURE 10 of the drawings, the same is adaptable to effectuate rotation of either adjustment screw 35 (FIGURES 1 through 5) or adjustment screw 75 (FIGURES 6 through 9) with provision having been made in this regard so as to permit adjustments in increments as small as one ten-thousandth of an inch. To this end the wrench 90 has a generally T-shaped configuration and includes a shaft portion 91 that has a cross section conforming to an appropriate size Allen wrench opening with end 92 being thus adapted to be inserted in the openings 35a or 75c as the case may be. It will be further noted that ninety degree indicia 100, 100 (FIGURES 2, 5 and 6) are provided on the projecting ends of the boring bars 30 and 70 with these indicia being intended to register with the longitudinally extending indicia 93, 93 that are provided on a sleeve member 94. In this regard sleeve member 94 is securely telescoped over shaft 91, with the diameter of sleeve 94 being such that the same may be freely received within either liner 33 or bore 72 as the case may be.

A turning handle 95 completes the detailed description of the turning wrench 90, with it being understood that the indicia 93, 93 are provided so that movement of one space with respect to any indicia 100, 100 results in a radial adjustment of .0001 inch.

It has been shown from the preceding paragraphs how there has been provided a new and improved type of micrometrically adjustable boring bar that is capable of being actually adjusted through increments of as small as ten-thousandth of one inch.

It has been seen how this incremental adjustment is achieved by the use of a flexing force applied to the free side of a key-way arranged cutting cartridge so that straight line linear movement in a horizontal path occurs.

It will be further seen how the flexing moment progressively increases as the cutting radius increases with the result that maximum force is applied where deflection would otherwise be most difficult.

While a full and complete description of the invention has been set forth in accordance with the dictates of the patent statutes, it is to be understood that the invention is not intended to be limited to the specific embodiment herein shown.

Accordingly, modifications of the invention may be resorted to without departing from the spirit hereof or the scope of the appended claims.

What is claimed is:

1. An adjustable boring bar of the character described, comprising:
 (A) an elongate body having a radially opening slot at one end;
 (B) a cutter socket extending axially of said body and opening into said slot;
 (C) an elongate cutting element including
  (1) a shank axially received in said socket,
  (2) a cutting tip,
   (a) adapted to be slidably received in said slot in key and slot type relationship therewith with the cutting edge of said tip projecting forwardly and sidewardly of said body; and
 (D) means within said slot for varying the depth to which said tip is received within said slot, whereby the cutting diameter of said boring bar can be varied.

2. The device of claim 1 further characterized by the fact that said shank has a reduced portion received within the forwardmost portion of said socket.

3. The device of claim 1 further characterized by the fact that said means include an adjustment screw having a camming block interposed between the bottom wall of said slot and the radially innermost edge of said tip, said camming block moving axially of said body upon rotation of said adjustment screw; the distance between the bottom wall of said slot and the radially innermost wall of said tip progressively increasing from the forward end of said boring bar rearwardly, whereby forward movement of said camming block flexes said tip within said slot in a radially outward direction.

4. An adjustable boring bar of the character described, comprising:
 (A) an elongate body portion having
  (1) an axis of rotation,
  (2) a first tapped opening extending inwardly from the operative end of said body,
  (3) a cartridge pocket including,
   (a) a tip receiving slot, coextensive with respect to said shank receiving opening and having parallel generally radially extending opposed walls connecting the outboard portion of said first tapped opening with the peripheral surface of said body, and
   (b) a shank receiving opening extending rearwardly from said tip receiving slot in substantially parallel, radially spaced, relationship to said first tapped opening;
 (B) an elongate adjustable camming element including
  (1) a threaded shank receivable in said first tapped opening, and
  (2) a head having a portion of its periphery received in the radially innermost portion of said slot between said walls and having its axial end accessible from the operative end of said body;
 (C) an elongate cutter cartridge including
  (1) a shank adapted to be axially inserted into said shank receiving opening, and
  (2) a coextensive tip having parallel surfaces adapted to slidingly engage said opposed walls of said slot and further having an inner edge adapted to bear against said head of said camming element; and
 (D) cam means
  (1) defined by said head of said camming element and said inner edge of said tip, and
  (2) adapted to radially flex said cartridge and move said tip relatively of said body within the confines of said slot upon adjustment of said camming element.

5. The device of claim 4 further characterized by the fact that said cam means include:
 (A) a peripheral surface on the head of said camming element; and
 (B) a tapered surface on the inner edge of said tip abutting said peripheral surface of said head.

6. The device of claim 4 further characterized by the fact that:
 (A) at least a portion of said shank of said cartridge is spaced from the interior walls of said shank receiving opening
  (1) whereby said shank may be flexed upon operation of said cam means.

7. The device of claim 4 further characterized by the fact that the point of application of flexing force to said cartridge by said cam means is progressively moved toward the outer axial end of said tip as said tip moves radially of said body whereby flexing pressure is increased.

8. The device of claim 4 further characterized by the presence of:
 (A) adjustment means including
  (1) a series of indicia on the operative end of said body, and
  (2) a wrench
   (a) adapted to engage said camming element, and
   (b) carrying indicia that are adapted to register with the indicia on said body
    (1) whereby the amount of radial movement of said tip may be controlled and measured.

9. The device of claim 8 further characterized by the fact that said wrench includes
 (A) a handle;
 (B) an elongate shank
  (1) projecting from said handle and
  (2) having its outboard end adapted to engage the head of said camming element;
 (C) a sleeve
  (1) carried by said shank adjacent its outboard end, and
  (2) having a series of indicia thereon adapted to register with said indicia on said body.

10. An adjustable boring bar of the character described, comprising:
 (A) an elongate body portion having
  (1) an axis of rotation, (2) a first tapped opening extending inwardly from the operative end of said body,
(3) a cartridge pocket including,
   (a) a shank receiving opening extending inwardly from said operative end in substantially parallel radially spaced relationship to said first tapped opening, and
   (b) a tip receiving slot, coextensive with respect to said shank receiving opening and having parallel generally radially extending opposed walls connecting the outboard portion of said first tapped opening with the peripheral surface of said body;

(B) an elongate adjustable camming element including
  (1) a threaded shank receivable in said first tapped opening, and
  (2) a head having a portion of its periphery received in the radially innermost portion of said slot between said walls and having its axial end accessible from the operative end of said body;

(C) an elongate cutter cartridge including
  (1) a shank adapted to be axially inserted into said shank receiving opening, and
  (2) a coextensive tip having parallel surfaces adapted to slidingly engage said opposed walls of said slot and further having an inner edge adapted to bear against said head of said camming element; and (D) a series of indicia carried on said operative end of said body;

(E) an adjustment wrench having
  (1) a handle and
  (2) a shaft
   (a) extending from said handle,
   (b) bearing indicia thereon that are adapted to register with said indicia on said body, and
   (c) with said shaft being adapted to engage the head of said camming element; and (F) cam means
  (1) defined by said head of said camming element and said inner edge of said tip, and
  (2) adapted to radially flex said cartridge and move said tip relatively of said body within the confines of said slot upon adjustment of said camming element by said wrench.

References Cited

UNITED STATES PATENTS

| | | | |
|---|---|---|---|
| 1,127,121 | 2/1915 | Wahlstrom | 77—76 |
| 1,144,795 | 6/1915 | Schmelzkopf | 77—58.32 |
| 1,746,381 | 2/1930 | Davis | 77—58.37 |
| 1,144,795 | 6/1915 | Schmelgkopf | 77—58.32 |
| 2,976,774 | 3/1961 | Hess | 77—75.5 |
| 2,998,737 | 9/1961 | Yogus et al. | 77—58.37 |
| 3,102,441 | 9/1963 | Milewski | 77—58.3 |
| 3,172,309 | 3/1965 | Cogsdill | 77—58.3 |
| 3,276,101 | 10/1966 | Plein | 77—58.32 |

GERALD A. DOST, *Primary Examiner.*